United States Patent [19]
Papsco

[11] 3,781,567
[45] Dec. 25, 1973

[54] LOW VOLTAGE POWER DISTRIBUTION SYSTEM

[76] Inventor: William G. Papsco, 145 Willowbrook Dr., Portola Valley, Calif. 94025

[22] Filed: Jan. 17, 1973

[21] Appl. No.: 324,550

[52] U.S. Cl. ................................. 307/147, 174/48
[51] Int. Cl. ............................................. H02b 1/20
[58] Field of Search ..................... 307/147; 174/48, 174/49; 339/22 R, 22 T

[56] References Cited
UNITED STATES PATENTS
3,082,290    3/1963    Ohmit ................................. 174/49
3,609,211    9/1971    Van Herk ........................... 174/49

*Primary Examiner*—J. R. Scott
*Assistant Examiner*—M. Ginsburg
*Attorney*—John F. Lawler

[57] ABSTRACT

Low voltage power is distributed throughout a room by one or more exposed suspended ceiling runners, each comprising a pair of panel support members which are electrical conductors, in conjunction with a power take-off post releasably clampable to the runner at a selected location in the room. Electrical energy from a 110-volt power line, for example, is connected to the conductive members of the runner through a step-down transformer so that only low voltage power, say 24 volts, is carried by the runner. The post has a self-contained preferably potted step-up transformer to change the voltage back to 110 volts at a convenience outlet in the post. In a two-wire system one line is connected to ground and the runner and post clamp are non-symmetrically configured to insure proper interconnection of the ground and hot lines, respectively. The undersides of the runners are protectively covered by an insulator so that only the side edges are exposed to the connector clamp on the top of the post.

7 Claims, 4 Drawing Figures

LOW VOLTAGE POWER DISTRIBUTION SYSTEM

BACKGROUND OF THE INVENTION

This invention relates to power distribution systems and more particularly to a low voltage power distribution system for rooms in buildings and the like.

The efficient use of room space in schools, libraries, hospitals, auditoriums, gymnasiums, cafeterias and convention halls is greatly enhanced by the use of removable walls and partitions. Open architectural design of such rooms is not only economical and functional but also provides substantially unlimited flexibility in space division as provided by modern portable and semi-permanent dividers and modular wall constructions. While such flexibility in the use of room space is highly desirable and advantageous, it poses a problem of distributing electrical energy for power or communication purposes to various locations in the room as needed or desired. Fixed conduit and fixture installations which may adequately serve users' needs in rooms having permanent walls are not capable of doing so efficiently in rooms with movable partitions or dividers.

Many of the rooms of the type described above have false ceilings with acoustic or other rectangular panels supported by a grid of runners or angled strips suspended from permanent roof girders and the like. This invention is directed to the distribution of electrical energy in rooms with such ceilings.

OBJECTS AND SUMMARY OF THE INVENTION

An object of the invention is the provision of an electrical energy distribution system for rooms having false ceilings of the type described.

A further object is the provision of a power distribution system which enables the user to select or change the location of the convenience outlet in a completed room without cutting into permanent walls or floors.

Still another object is the provision of such a system in which the location of power outlets may be quickly and safely changed in a matter of minutes.

These and other objects of the invention are achieved by using one or more ceiling panel support runners, each extending the full dimension of the room and constructed of a pair of electrical conductors insulated from each other and connected to a source of low voltage electrical energy. One or more power take-off posts are releasably clampable to the electrified runners at selected locations, each post having a self-contained voltage step-up transformer and convenience outlet means at user level.

DESCRIPTION OF PREFERRED EMBODIMENTS

Figure 1:
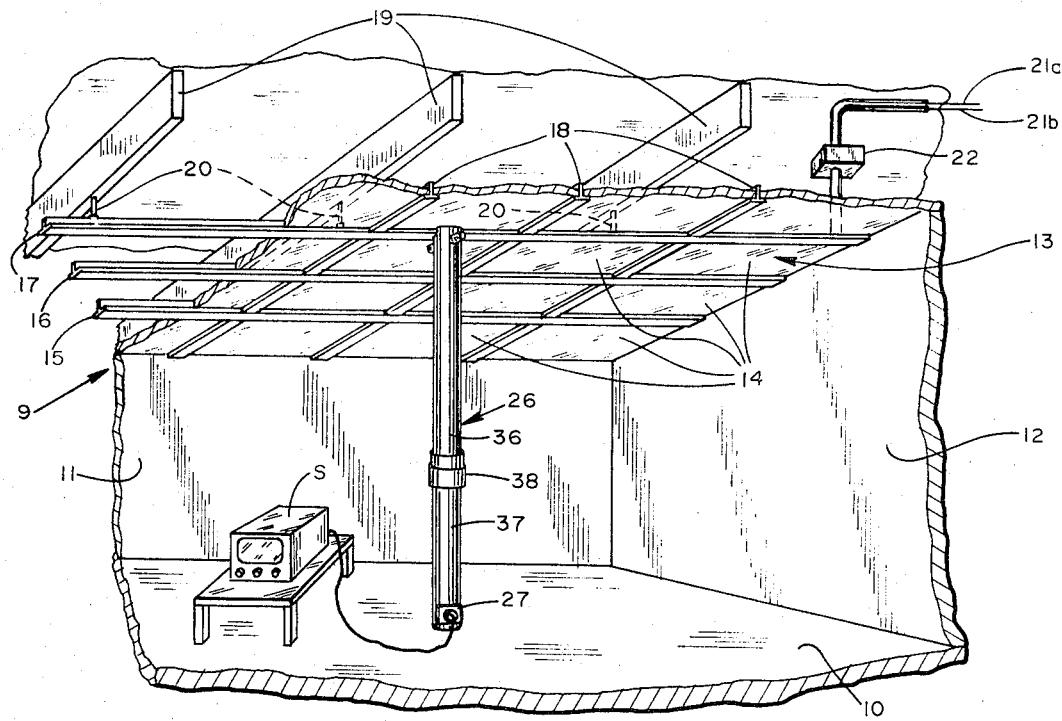
FIG. 1 is a perspective view of part of a room with the walls broken away and showing a power distribution system embodying the invention.

Referring now to the drawings, a power distribution system embodying the inventoin is shown in FIG. 1 in a room 9 having a floor 10, side walls 11 and 12 and a suspended ceiling 13. Ceiling 13 comprises a plurality of panels 14 supported on a grid of main runners, three of which are shown at 15, 16 and 17, and cross members or tees 18, the former being suspended from roof joists 19 by hangers 20. In accordance with the invention, electrical power is distributed within the room to utilization apparatus such as television set S from a source outside the room through 110 volt a-c power lines 21a and 21b, see FIG. 2, a 110 volt to 24 volt step-down transformer 22 with primary winding 22a and secondary winding 22b, low voltage lines 23a and 23b, main runner 17 and a power take-off post 26 connected between the runner 17 and floor 10. Post 26 has a 110 volt a-c electrical convenience outlet 27 near its base to which the power cord of the television set is connected.

Power line 21b is grounded as shown and one set of adjacent terminals of primary and secondary windings 22a and 22b, respectively, are electrically interconnected by jumper 24 so that low voltage line 23b connected to this terminal of the secondary winding is likewise at ground potential. While the invention is described and illustrated herein with but one electrical runner 17 and one post 26 for clarity of the explanation, it will be understood that the invention comprehends such energization and utilization of as many of the runners and posts as may be desired or required by the particular room and its intended use. The low voltage value of energy distributed by the ceiling runners is intended to be that which is permitted by the building code to be distributed by exposed conductors, the 24 volts being merely exemplary of one of such values which meets a widely adopted code requirement.

Figure 4:
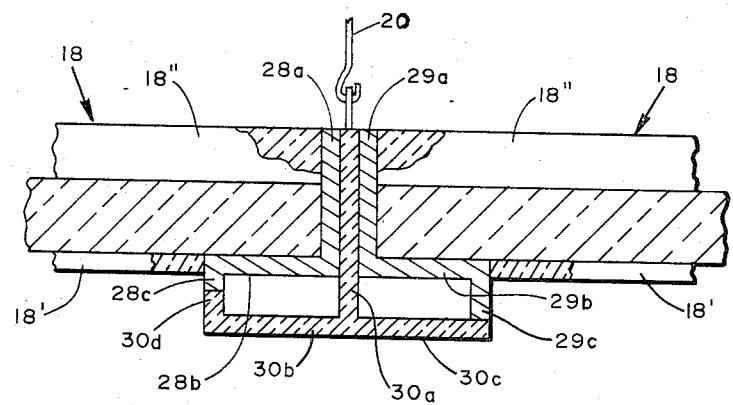
FIG. 4 is a transverse section of one of the ceiling runners showing the interconnection of the cross tees with the runner.
Figure 2:
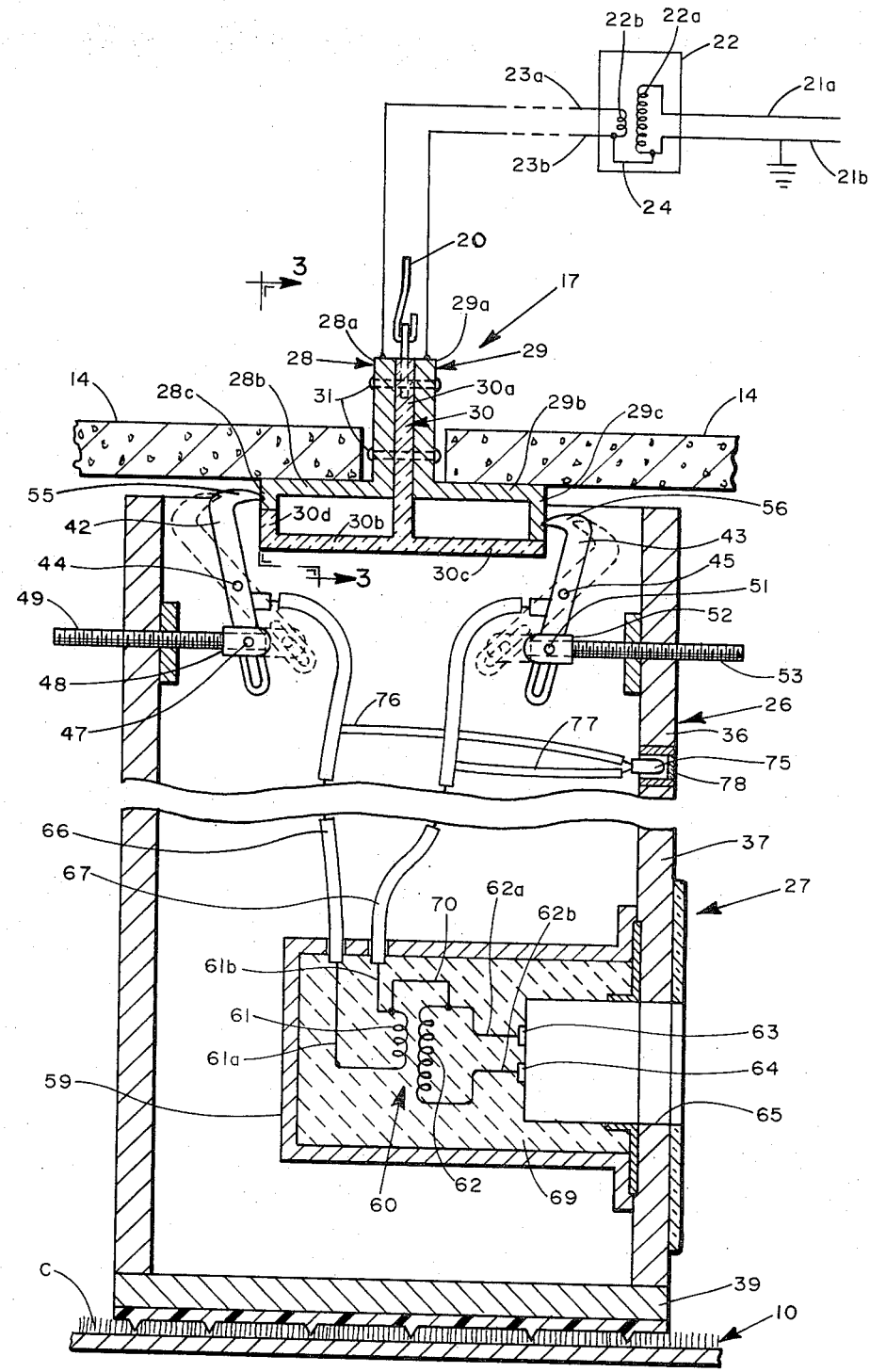
FIG. 2 is an enlarged vertical section of a power take-off post and an electrified ceiling runner embodying the invention, and showing construction details.

Runner 17 preferably is a laminar structure and comprises coextensive longitudinally extending generally L-shaped electrically conductive members or conductors 28 and 29 electrically connected to low voltage power lines 23a and 23b, respectively, and separated over their entire lengths by an insulator bar 30 having a generally inverted T-shaped cross-section, see FIGS. 2 and 4. Members 28 and 29 have vertical legs 28a and 29a, horizontal legs 28b and 29b, and contact flanges 28c and 29c, respectively. The heights and widths of the vertical and horizontal legs of members 28 and 29 preferably are the same but the height of flange 29c is substantially greater than the corresponding dimension of flange 28c. Insulator bar 30 has a vertical leg 30a, cross legs 30b and 30c and a lip 30d extending upwardly from the outer end of cross leg 30b to abut the lower edge of flange 28c; the other cross leg 30c abuts the lower edge of flange 29c. Vertical legs 28a and 29a of the members are secured together and to vertical leg 30a of bar 30 by electrically non-conductive rivet-like fasteners 31 which extend through these legs at appropriate longitudinally spaced intervals. Alternatively, the legs of the members may be cemented to the insulator leg.

Figure 3:
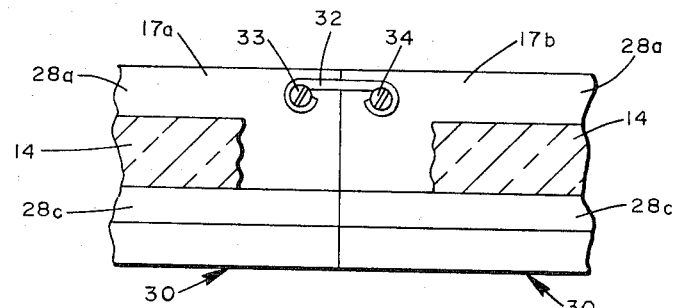
FIG. 3 is a view taken on line 3—3 of FIG. 2 showing the junction of adjacent lengths of a ceiling runner embodying the invention.

Main runner 17 of the ceiling grid is cut to appropriate lengths for convenient handling and installation and adjacent lengths, shown at 17a and 17b in FIG. 3, are abutted in end-to-end relation and are electrically connected together by a jumper 32 secured by screws 33 and 34 to the adjacent ends of these lengths. Hangers 20 for runner 17 preferably are made of an electrically non-conducting material in order to insure insulation of the runner from the roof joists. In order to prevent shorting of electrified runners by the cross tees 18, one embodiment of the invention utilizes cross tees made of non-conducting material such as synthetic resin or the like, see FIG. 4. Tees 18 engage runner 17 with bottom legs 18' abutting the upper parts of flanges 28c and 29c of members 28 and 29 and with the upper leg 18'' extending over and resting on legs 28b and 29b of the members. The ends of runner 17 at the adjacent side walls of the room are covered with suitable insulator caps, not shown, to electrically isolate the runner from the walls.

Post 26 is tubular in shape and preferably has upper and lower sections 36 and 37, respectively, joined by a coupling 38 which provides a means for adjusting the post height. The base of the post is closed by a plate 39 to which a friction element 40 is secured for frictionally engaging the floor covering C, such as carpeting, as shown in FIG. 2. The top end of upper post section 36 is open and is spaced closely to ceiling panels 14. In order to provide electrical contact with conductors 28 and 29 of runner 17, electrically conductive arms 42 and 43 are pivotally mounted within and near the upper end of the post by insulator pins 44 and 45, respectively, which extend through the arms and the post side wall. The lower end of arm 42 is pivotally connected by pin 47 to a dielectric cap 48 non-rotatably mounted on the inner end of screw 49 which extends outside the post wall and in threaded engagement therewith. Similarly, arm 43 is connected by pin 51 to non-conducting cap 52 mounted on screw 53. The upper ends of arms 42 and 43 are formed with inwardly projecting preferably pointed heads 55 and 56, respectively, adapted to make electrical contact with runner conductive flanges 28c and 29c, respectively.

Arms 42 and 43 are mounted on the post so that head 55 of arm 42 is higher than head 56 of arm 43 such that the heads are engageable with flanges 28c and 29c, respectively, only when the post is in the position shown in FIG. 2 relative to the runner 17. Thus, if the post is rotated about its axis by 180 degrees from the position shown so that arm 43 is adjacent to conductor 28, head 56 is lower than contact flange 28c and cannot make electrical contact with it. The purpose of this non-symmetrical construction of arms 42 and 43 and of runner 17 is to insure connection of the grounded lines in the post with the grounded conductor in the runner. Rotation of screws 49 and 53 cause the contact arms to pivot about their respective pins from an inoperative position shown in broken lines in FIG. 2 to an operative position shown in solid lines in which heads 55 and 56 releasably clamp or "bite" on contact flanges 28c and 29c, respectively, with sufficient force to insure positive electrical contact between these parts.

Enclosed within and supported on the lower end of post section 37 is convenience outlet 27 comprising a housing 59 enclosing a 24-volt to 110-volt step-up transformer 60 with a primary winding 61 and a secondary winding 62, and contacts 63 and 64 adjacent to an opening 65 in the post wall. Contacts 63 and 64 are connected to terminals 62a and 62b, respectively, of the secondary coil 62 and are adapted to be engaged by the prongs on a conventional electrical plug on the cord of utilization apparatus such as TV set S. Terminals 61a and 61b of primary coil 61 are connected to lines 66 and 67, respectively, which extend up through the post for connection to contact arms 42 and 43 at the upper end of the post. Transformer 60 preferably is secured within housing 59 in a dielectric potting material 69 as shown. A jumper 70 electrically interconnects terminals 61b and 72a of the primary and secondary windings 61 and 62, respectively.

In practice, one or more runners 17 are used in the installation of a ceiling in accordance with the requirements for distribution of power within the room, the runners comprising the two conductive members and an intermediate insulator being prefabricated in convenient lengths and delivered to the installation site. After the runners and cross tees have been suspended from the roof joists, the ceiling panels are placed in the resulting grid and the runners designed to be electrified as described above are electrically connected to the low voltage side of one or more transformers 22. It should be noted that the undersides of the electrified runners are covered by the horizontal legs 30b and 30c of the insulator 30 to prevent inadvertent shorting of the runner conductors. Except for a slightly increased depth of projection of the electrified runner below the ceiling panels, the electrified and non-electrified runners and cross tees are dimensionally similar so as to appear to occupants of the room to be substantially the same as a conventional suspended ceiling grid.

In order to tap power from a runner 17 at a selected location in the room post 26 is erected at the site between the floor and ceiling in vertical alignment with the runner so that the upper end of the post symmetrically overlies the underside of the runner. At this time, contact arms 42 and 43 are in the inoperative position shown in broken lines in FIG. 2 and base of the post is firmly set on and thus anchored to the floor covering. Proper positioning of the post relative to the "hot" and grounded runner members 28 and 29, respectively, may be facilitated by marks on the sides of the post and runner that are easily seen and matched by the installer. Screws 49 and 53 are then turned to move contact arms 42 and 43, respectively, to the operative positions in firm electrical contact with members 28 and 29, respectively. Power is then delivered to convenience outlet 27 at the base of the post and the operation is complete.

If the installer incorrectly reverses the position of the post with respect to the "hot" and grounded runner members, the result would be that lower contact arm 43 would make contact with lip 30d of insulator 30 and not with "hot" member 28 and no power would be delivered to the convenience outlet. With this arrangement, connection of the "ground" conductors in the post with the "hot" conductor in the runner is prevented.

The system described above may also be utilized to distribute other forms of electrical energy throughout a room with appropriate input and output devices. For example, radio or audio frequency energy may be coupled to the runner members and superimposed on the 110-volt a-c energy and may be tapped from lines 66 and 67 in the post for connection to receiver apparatus including headphones or a loudspeaker. Also, other types of energy take-off posts may be employed including extensions of portable wall structures and partitions.

In order to indicate to the installer and others that the post is properly oriented with respect to electrified members 28 and 29 when arms 42 and 43 are clamped against them, an indicator lamp 75 is connected by lines 76 and 77 to post lines 66 and 67, respectively. Illumination of lamp 75 may be observed externally of the post through a receptacle window 78.

What is claimed is:

1. An electrical energy distribution system for a room having a suspended ceiling with panels mounted in a grid of runners and cross tees, comprising
   at least one runner having longitudinally coextensive first and second electrically conductive panel support members secured to and spaced by an intermediate insulator bar, each of said members having a portion thereof exposed below the panels for the full length of the member,
   means for electrically energizing said members, and
   an energy take-off post extending between the floor of the room and said one runner,
      said post having clamp means at the upper end releasably engageable with said members for making electrical contact therewith,
      said post also having a convenience outlet near the lower end thereof and electrically connected to said clamp means for distributing the electrical energy to utilization apparatus at floor level.

2. An energy distribution system according to claim 1 in which said energy is a-c power, said energizing means comprising a voltage step-down transformer having a high voltage input connected to a conventional a-c power source and a low voltage output connected to said members, respectively, said convenience outlet in said post comprising a voltage step-up transformer for reconverting the energy from low to high voltage.

3. The system according to claim 2 in which said members are non-symmetrical with respect to the intermediate insulator bar, one of said members being grounded, said clamp means comprising two contact arms non-symmetrically mounted on the post whereby to pass said energy to said convenience outlet only when said post is in one predetermined position relative to said members.

4. The system according to claim 3 in which the other of said members projects a greater distance below the ceiling panel plane than said one member and one of said arms is mounted higher on said post than the other arm.

5. The system according to claim 1 in which said insulator bar covers the undersides of said members whereby the sides only of the members are exposed for contact by said clamp means.

6. The system according to claim 5 in which each of said members as a generally L-shaped cross-section with a vertical and a horizontal leg, said insulator bar having a generally inverted T-shaped cross-section with a vertical leg between the vertical legs of said members and horizontal legs underlying the horizontal legs, respectively, of the members.

7. The system according to claim 1 in which said post has a base with a friction plate for frictionally engaging said floor.

* * * * *